United States Patent [19]

Flamm et al.

[11] Patent Number: 4,539,583
[45] Date of Patent: Sep. 3, 1985

[54] DIGITAL INTEGRATED CHROMINANCE-CHANNEL CIRCUIT WITH GAIN CONTROL

[75] Inventors: Peter M. Flamm, Freiburg; Daniel Mlynek, Wolfgantzen; Friedrich Schmidtpott; Alfred Praxmarer, both of Gundelfingen, all of Fed. Rep. of Germany

[73] Assignee: ITT Industries, Inc., New York, N.Y.

[21] Appl. No.: 486,755

[22] Filed: Apr. 20, 1983

[30] Foreign Application Priority Data

May 27, 1982 [EP] European Pat. Off. ........... 82710033

[51] Int. Cl.³ .............................................. H04N 9/535
[52] U.S. Cl. ..................................................... 358/27
[58] Field of Search .......................................... 358/27

[56] References Cited

U.S. PATENT DOCUMENTS 4,419,688 12/1983 Miskin et al. .......................... 358/27

Primary Examiner—John C. Martin
Assistant Examiner—Michael Dunnam
Attorney, Agent, or Firm—Donald J. Lenkszus

[57] ABSTRACT

An improved digital integrated chrominance-channel circuit having gain control for color-television receivers includes at least one integrated circuit for digitally processing the composite color signal. The circuit includes a first limiter inserted between a parallel multiplier and a burst-amplitude-measuring stage, and a control stage including a parallel subtracter whose minuend input is fed with a reference signal, and whose subtrahend input is connected to the output of the burst-amplitude-measuring stage. A digital accumulator whose enable input is presented with a signal derived from the trailing edge of a burst gating signal is used as an integrator.

12 Claims, 3 Drawing Figures

4,539,583

DIGITAL INTEGRATED CHROMINANCE-CHANNEL CIRCUIT WITH GAIN CONTROL

BACKGROUND OF THE INVENTION

1. Field of the Invention

The present invention relates to a digital integrated chrominance-channel circuit with gain control for color-television receivers containing at least one integrated circuit for digitally processing the composite color signal.

2. Description of the Prior Art

A chrominance-channel circuit is disclosed in the published patent application EP 51075 A1. (U.S. application Ser. No. 311,218, Oct. 11, 1981).

Practical tests of color-television receivers with digital signal processing circuitry have shown that the prior art chrominance-channel circuit still has a few disadvantages. For example, the burst-amplitude-measuring circuit is not yet optimal because it is possible in the prior art arrangement that the burst signals are sampled, i.e., measured, near or at the zero crossing. As these measured values are small, so that the digitized values formed therefrom are small numbers, the measurement error is large.

Another disadvantage of the prior art arrangement is that it has two set points for the gain control, namely a lower and an upper threshold level in the form of corresponding numbers entered into two read-only memories. Finally, the integration of the control signal is implemented with two counters, so that the time constant of this "integrator" is determined only by the clock signals for the counters and by the count lengths of these counters. As to the prior art, reference is also made to the journal "Fernseh- und Kino-Technik", 1981, pages 317 to 323, particularly FIG. 9 on page 321. However, the digital chrominance-channel circuit shown there works on the principle of feed-forward control, while both the invention and the above-mentioned prior art use a feedback control system, so that the arrangement disclosed in that journal lies further away from the present invention, the more so since in that prior art arrangement, the set point is implemented only with the concrete circuit (hardware).

SUMMARY OF THE INVENTION

The invention as claimed eliminates the above disadvantages and, thus, has for its object to improve the prior art digital integrated chrominance-channel circuit with gain control in such a way that error-free burst amplitude measurement is ensured, that a single set point can be generated, and that the integration of the control signal is implemented in optimum fashion. Another object of the invention is to modify the chrominance-channel circuit so that the automatic control system can be opened for measuring purposes.

DESCRIPTION OF THE INVENTION

Figure 1:
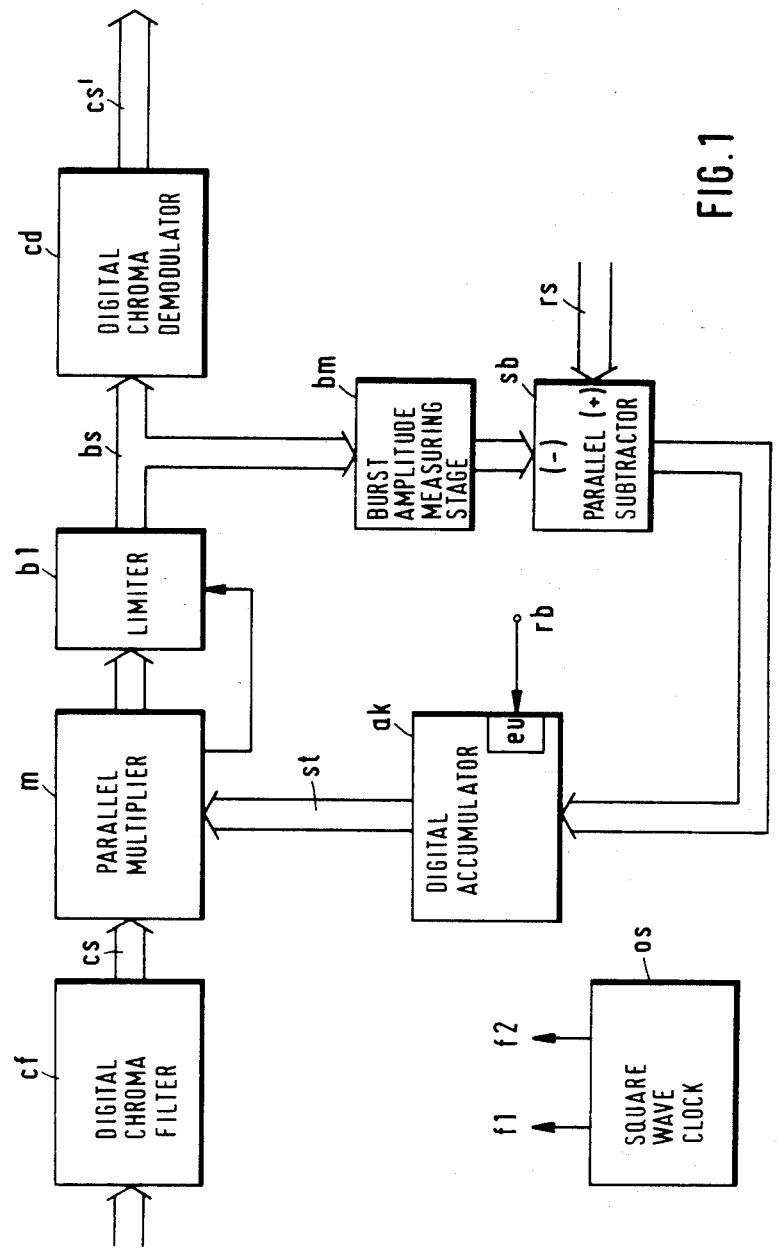
FIG. 1 is a block diagram of the chrominance channel in accordance with the invention.

The block diagram of FIG. 1 includes a digital chroma filter cf, which derives a digital chrominance signal cs from a digitized composite color signal. The digital chrominance signal cs is applied to a first input of a parallel multiplier m, whose second input is fed with a digital gain control signal st. The output of the parallel multiplier m is connected to an input of a first limiter b1, which limits the output signals from the parallel multiplier m to a predetermined value. This can be done by arranging, for example, that at least one of the high-order digits of the output signal from the parallel multiplier is indicated by the interconnecting lead between these two subcircuits in FIG. 1.

In the figures of the accompanying drawing, the lines interconnecting the signal inputs and outputs of the individual subcircuits are shown as stripelike connections (buses), while the solid lines commonly used to indicate interconnections in discrete-component circuits are used for interconnections over which only individual bits or clock and/or noise signals are transferred. The stripelike lines thus interconnect parallel inputs and parallel outputs, i.e., inputs to which complete binary words are applied, which are transferred in parallel into the subcircuit at a given time, and outputs which provide complete binary words.

An output signal bs of the first limiter b1 is applied to the input of a burst-amplitude-measuring stage bm, which has its output coupled to a subtrahend input (−) of a parallel subtracter sb, while its minuend input (+) is fed with the reference signal rs, i.e., the set point. The output of the parallel subtracter sb is connected to the input of a digital accumulator ak, which provides the digital gain control signal st, which is applied to the second input of the parallel multiplier m, as mentioned above. A signal rb derived from the trailing edge of the burst gating signal (keying pulse) is applied to an enable input eu of the accumulator ak.

It is also indicated in FIG. 1 that a square-wave clock generator os, used as a chrominance-subcarrier oscillator, forms part of the invention. It provides at least the first clock signal f1, whose frequency is four times that of the chrominance subcarrier, and a second clock signal f2, having the same frequency as the chrominance subcarrier.

Figure 2:
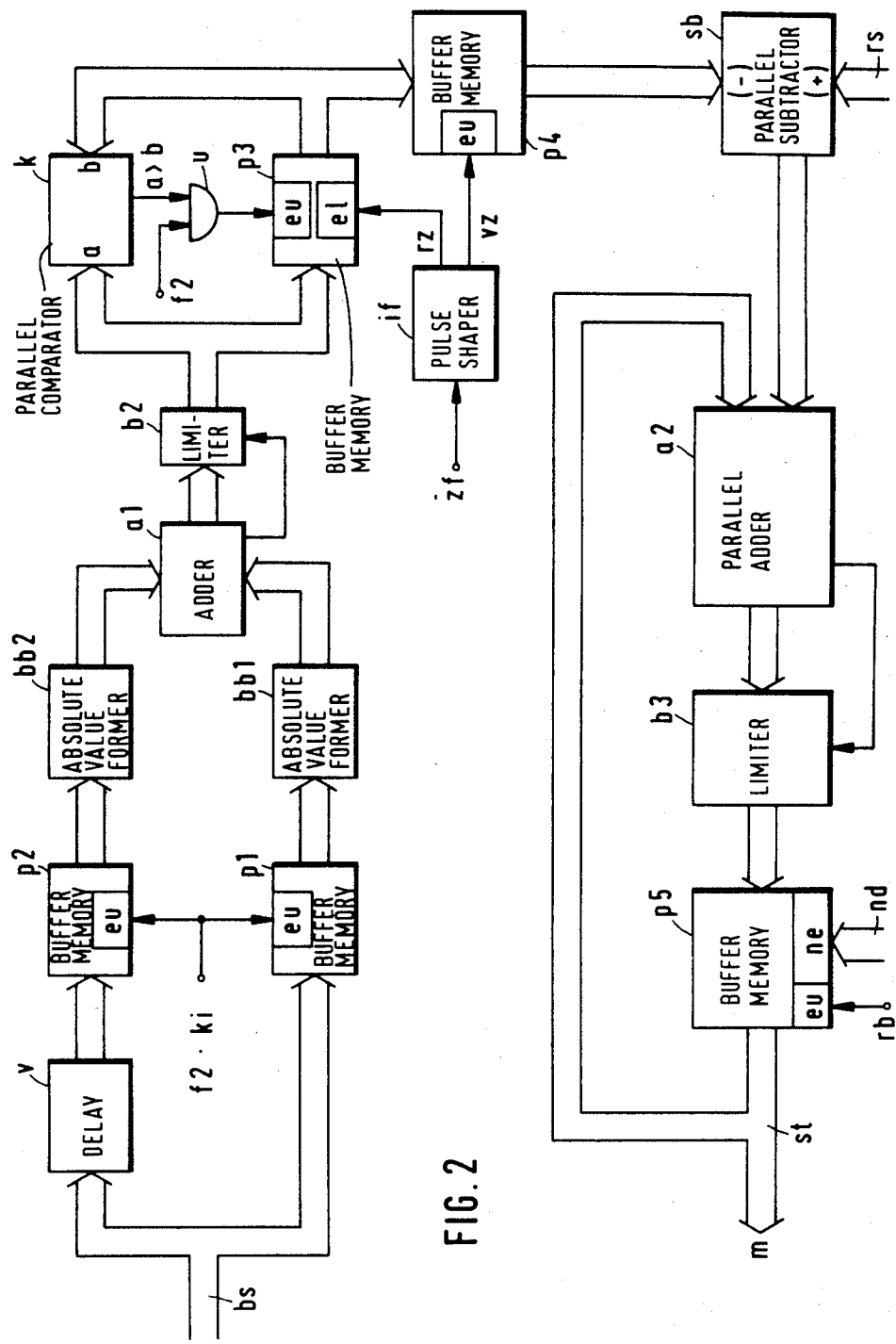
FIG. 2 is a block diagram of a preferred embodiment of the burst-amplitude-measuring stage and the digital accumulator.

FIG. 2 is a block diagram of a preferred embodiment of the burst-amplitude-measuring stage bm and the digital accumulator ak of FIG. 1. The burst-amplitude-measuring stage in FIG. 2 comprises all subcircuits ahead of the subtrahend input (−) of the parallel subtracter sb, while the accumulator consists of the subcircuits following the output of the parallel subtracter sb.

The output signal bs from the first limiter b1 of FIG. 1 is applied in FIG. 2 to the input of a first buffer memory p1 and, through a delay element v, which provides a delay equal to the period of the first clock signal f1, i.e., to one quarter or 90° of the chrominance-subcarrier frequency, to an input of a second buffer memory p2.

The second clock signal f2 is applied to the enable inputs eu of these two buffer memories p1, p2 during the burst gating signal ki, which is indicated in FIG. 2 by the logical term f2.ki. During the keying pulse ki, whose duration usually equals about 10 periods of the chrominance-subcarrier frequency, a corresponding number of digital values are thus transferred successively from the first limiter b1 into the two buffer memories p1, p2, the values transferred into the second buffer memory p2 differing in phase from those transferred into the first buffer memory p1 by the aforementioned 90°; thus, two zero-crossing values are never evaluated at the same time.

The outputs of the two buffer memories p1, p2 are connected to the inputs of a first absolute-value former bb1 and a second absolute-value former bb2, respectively, whose outputs are coupled to a first and a second input, respectively, of a first adder a1. The absolute-value formers bb1, bb2 provide digital values without the sign of the input value, i.e., without the sign bit, for example. They thus contain a subcircuit which converts negative numbers in one's or two's complement notation into the corresponding positive number, i.e., they include complement reconverters.

The first adder a1 is followed by the second limiter b2, whose limiting action is controlled by at least one of the high-order digits of the first adder a1.

The output signal from the second limiter b2 is applied to the input of a third buffer memory p3 and to a minuend input a of a parallel comparator k, which has its subtrahend input b connected to the output of the third buffer memory p3.

In the present description, the two inputs of the parallel comparator k, too, are referred to as "minuend input" and "subtrahend input", respectively, which is considered justifiable in view of the fact that, purely formally, the arithmetic operation performed by comparators is more closely related to subtraction than to addition by means of an adder, even though the internal circuit of a comparator resembles that of an adder more than that of a subtracter, cf. the corresponding mathematical operations a−b and a b as opposed to a+b.

The minuend-greater-than-subtrahend output a>b of the parallel comparator k is connected to the enable input eu of the third buffer memory p3 via the first input-output path of the AND gate u, while the second clock signal f2 is applied to the second input of the AND gate u. The output of the third buffer memory p3 is also connected to an input of a fourth buffer memory p4, which has its output coupled to the subtrahend input (−) of the parallel subtracter sb. The enable input eu of the fourth buffer memory p4 is presented with a signal vz derived from the trailing edges of horizontal-frequency pulses zf, which, however, do not coincide with the burst gating signal ki, while a signal rz derived from the trailing edges of the horizontal-frequency pulses zf not coinciding with the burst gating signal ki is applied to the clear input el of the third buffer memory p3.

The derivation of the two signals rz, vz from the horizontal-frequency pulses zf is indicated in FIG. 2 by a pulse-shaper stage if. The section consisting of the two buffer memories p3, p4, the parallel comparator k, the AND gate u, and the pulse shaper if determines, for each line of the television picture, the maximum value of the burst amplitude from the—possibly limited—output signal of the first adder a1, and feeds this maximum value to the subtrahend input (−) of the parallel subtracter sb. This is achieved essentially by transferring only those words of the output signal of the second limiter b2 into the third buffer memory p3 which are greater than any word already stored in the third buffer memory p3. This is done line by line during the keying pulse ki.

As mentioned, a preferred embodiment of the accumulator ak of FIG. 1 is shown in the lower portion of FIG. 2. The output signal from the parallel subtracter sb is applied to a first input of a second parallel adder a2, which has its output connected to an input of a fifth buffer memory p5 through the third limiter b3. To realize the adding function, the output of the fifth buffer memory p5 is connected to the second input of the second adder a2. The buffer memory p5 has, in addition to the enable input eu, which is the enable input of the accumulator ak of FIG. 1, the normalizing-data inputs ne, through which normalizing data nd, i.e., known data, can be entered if necessary. The enable input eu is presented with the signal rb derived from the trailing edge of the burst gating signal ki. With the trailing edge of the keying pulse, the output signal from the third limiter b3 is thus transferred into the fifth buffer memory p5 and simultaneously transferred to the output. With the trailing edge of each keying pulse, the sum of the value from the preceding line and the set-point deviation calculated in the measured line by the parallel subtracter sb is thus produced line by line as the control signal st.

Thus, the essential advantages of the invention follow directly from the solution of the problem, namely particularly the line-by-line subtraction of the maximum burst amplitude, which is integrated in the accumulator ak to form the control signal st for the automatic control system, from the reference signal rs.

Figure 3:
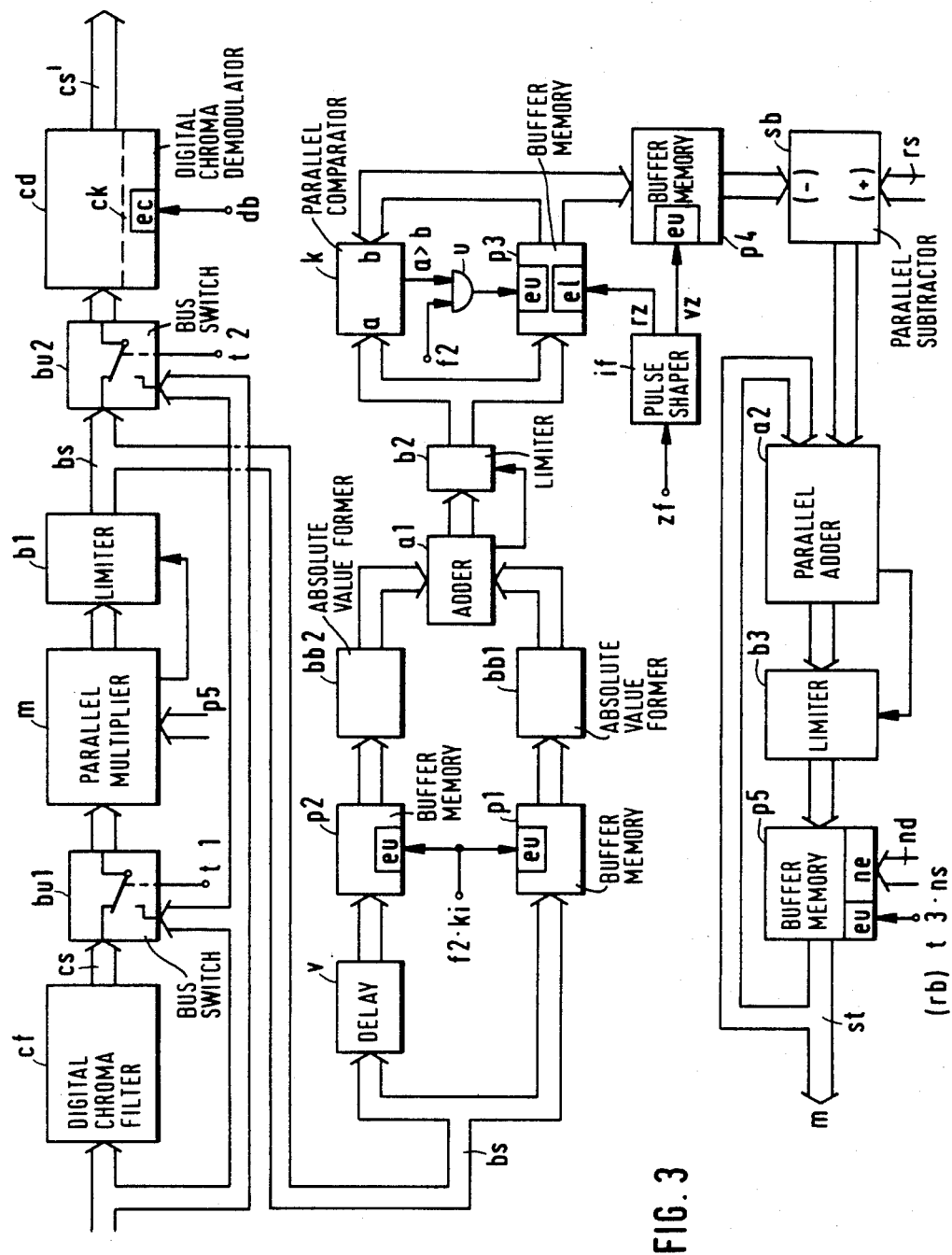
FIG. 3 is a block diagram of another embodiment of the invention with the aforementioned measuring facility.

FIG. 3, a block diagram like FIGS. 1 and 2, shows a preferred embodiment of the invention which makes it possible to test the digital automatic control system after the fabrication of the integrated circuit, and to make the test-result signals accessible. The testing is necessary because the automatic control system contains several subcircuits each of which may be faulty. The test procedure and the design of the overall circuit must therefore be adapted to one another in such a way that all subcircuits of the automatic control system can be tested with little additional circuitry.

To this end, the path from a break-contact input to an output of a first bus switch bu1, whose make-contact input is connected to the input of the chroma filter cf, is interposed between the output of this chroma filter and the associated input of the parallel multiplier m, as shown in the block diagram of FIG. 3. For the graphic representation of the bus switch bu1, the symbol of a mechanical transfer switch has been chosen, with the above mentioned stripelike interconnecting lines, i.e., buses, connected to the signal inputs and the output of the switch. It is thus clear that the bus switch consists of as many individual electronic switches as there are wires in the buses.

Inserted between the output of the first limiter b1 and the input of the chroma demodulator cd, which is also present in FIG. 1, where it "demodulates" the output signal bs of the first limiter b1 into the chroma signal cs, is a path from a break-contact input to an output of a second bus switch bu2, which has its make-contact input am connected to the input of the chroma filter cf. Viewed in the direction of signal flow, the second bus switch bu2 lies behind the junction point where the signal bs for the burst-amplitude-measuring circuit is taken off. What was said on the circuit design and the graphic representation of the first bus switch bu1 applies analogously to the second bus switch bu2.

The first test enable signal t1 and the second test enable signal t2, which does not overlap the first test enable signal t1, are applied to the control input of the first bus switch bu1 and to the control input of the second bus switch bu2, respectively. Thus, when the second bus switch bu2 is in its "make" position, the first bus switch bu2 is in its "break" position, and vice versa.

During the first test enable signal t1, an actuating signal db is applied to the input ec of the color killer stage ck of the chroma demodulator cd, so that the latter is active during the testing of the automatic control system although the circuit is not in its normal mode of operation but only in a test mode.

The enable input eu of the accumulator ak, i.e., the enable input eu of the fifth buffer memory p5 in FIG. 3, may be fed with a normalizing signal ns during the third test enable signal t3. During testing and measurement, instead of the signal rb, derived from the trailing edge of the keying pulse and applied in the normal mode of operation, the normalizing signal ns is applied to the enable input eu of the fifth buffer memory p5 and causes the normalizing data nd to be transferred into this buffer.

In addition to the usual contact pads of the integrated circuit, through part of which the output signal cs of the chroma demodulator cd is coupled out, a contact pad is provided via which test-result signals of individual subcircuits are accessible, i.e., transferred out of the integrated circuit. These test-result signals are advantageously coupled to this additional contact pad through transfer transistors which, in turn, are driven by the above-mentioned test enable signals or corresponding additional signals of this kind or by signals derived by performing simple logic operations on the signals just mentioned. In this manner, only the respective subcircuit to be tested is connected to the additional contact pad.

An advantageous method of testing the chrominance-channel circuit according to the invention consists in the following time sequence of test steps. In the first step, the chroma demodulator cd is tested. This is necessary because, throughout the testing of the chrominance-channel circuit, signals are transferred out through the chroma demodulator cd and must not be falsified by the latter.

This first test step is performed by applying the second test enable signal t2 to the control input of the second bus switch bu2, the actuating signal db to the input ec of the color killer stage ck, and a known data sequence, i.e., a test-data sequence, to the input of the chroma filter cf. The application of the actuating signal db to the input ec of the color killer stage ck is necessary because an actual actuating signal coming from other stages of the chrominance-channel circuit is applied to the color killer only during normal operation of the chrominance-channel circuit, cf. the above-mentioned printed publication EP 0 051 075 Al.

In response to the application of the second test enable signal t2 to the second bus switch bu2, the input signals of the chroma filter cf are transferred directly to the input of the chroma demodulator cd, so that, if a known test-data sequence is used, the performance of the chroma demodulator cd can be checked by means of the output signals.

In the second step, the parallel multiplier m is tested. This is done by applying the first test enable signal t1 to the control input of the first bus switch bu1, the third test enable signal t3 and the normalizing signal ns to the enable input of the accumulator ak, i.e., to the enable input of the fifth buffer memory p5, for example; the normalizing data nd are applied to the normalizing-data input ne of the fifth buffer memory p5, and a known data sequence, i.e., a test-data sequence, is applied to the input of the chroma filter cf.

As in the first test, the first test enable signal t1 causes the test-data sequence to bypass the chroma filter cf, so that the test data are applied directly to one input of the parallel multiplier m. This bypassing of the chroma filter cf is necessary because the chroma filter is generally a dynamic subcircuit, which is not suitable for being included in the individual tests for this reason alone.

As a result of the entry of normalizing data into the accumulator ak or into the fifth buffer memory p5 as a subcircuit of the accumulator, known data are also applied to the second input of the parallel multiplier m, so that the output signal of the latter is predeterminable, which makes it possible to check the correct functioning of the multiplier. Since the chroma demodulator cd was tested already in the first test step, the data appearing at its output during the second test step are the unchanged output data of the parallel multiplier m if the chroma demodulator cd was found to operate correctly.

Further tests may now be performed on the absolute-value formers bb1, bb2, the first adder a1, and the parallel comparator k. To do this, the first test enable signal t1 is applied to the control input of the first bus switch bu1, and known data sequences are applied to the input of the chroma filter cf, the individual test results being accessible via the above-mentioned additional contact pad and being generally present in the form of a go/no-go decision.

The last test to be performed is that of the accumulator ak. To this end, the first test enable signal t1 is applied to the control input of the first bus switch bu1; the third test enable signal t3 and the normalizing signal ns are applied to the enable input of the accumulator ak, i.e., to the corresponding input of the fifth buffer memory p5, for example; a trigger signal is applied to the second limiter b2, and known data sequences are fed to the minuend input (+) of the parallel subtracter sb. With the second limiter sb2 triggered, one of the input signals of the accumulator is predetermined and, thus, known because the output data of the subtracter sb are known as well. The accumulator ak can thus be tested by varying the reference data rs.

The reference data rs, the above-mentioned various test-data sequences, and the normalizing data nd may come from a microprocessor.

We claim:

1. A digital integrated chrominance-channel circuit with gain control for color-television receivers, comprising:

at least one integrated circuit for digitally processing the composite color signal, wherein a digital chrominance signal appearing at an output of a digital chroma filter is applied to a first input of a parallel multiplier, and a digital gain control signal is applied to a second input of the parallel multiplier, the output of the parallel multiplier is connected to an input of a digital chroma demodulator with a color killer stage and to an input of a burst-amplitude-measuring stage whose output signal is compared with a reference signal in a control stage, the output signal of the control stage passes through an integrator whose output signal is the gain control signal;

a square-wave clock generator used as a chrominance subcarrier oscillator generates at least a first clock signal, whose frequency is four times that of the chrominance subcarrier, and a second clock signal, whose frequency is equal to that of the chrominance subcarrier; and a first limiter is inserted between the parallel multiplier and the burst-amplitude-measuring stage, the control stage is a parallel subtracter whose minuend input is presented with the reference signal, and whose subtrahend input is connected to the output of the burst-amplitude-measuring stage and the integrator is a digital accumulator whose enable input is fed with a signal derived from the trailing edge of a burst gating signal.

2. A chrominance-channel circuit as claimed in claim 1, wherein the output signal from the first limiter is applied to the input of a first buffer memory and, through a delay element which provides a delay equal to the period of the first clock signal, to the input of a second buffer memory, the second clock signal being applied to the enable inputs of the first and second buffer memories during the burst gating signal, the output signals from the first buffer memory and the second buffer memory are fed, respectively, to a first absolute-value former and a second absolute-value former which have their outputs connected to the first and the second input, respectively, of a first parallel adder, the output of the first parallel adder is connected via a second limiter to the input of a third buffer memory and to the minuend input of a parallel comparator whose minuend-greater-than-subtrahend output is coupled to the enable input of the third buffer memory through the first input-output path of an AND gate whose second input is fed with the second clock signal, and the output of the third buffer memory is coupled to the subtrahend input of the parallel comparator, the output of the third buffer memory is connected to the input of a fourth buffer memory whose output is coupled to the subtrahend input of the parallel subtracter, and whose enable input is fed with a signal derived from the leading edges of horizontal-frequency pulses not coinciding with the burst gating signal, and the clear input of the third buffer memory is fed with a signal derived from the trailing edges of the pulses not coinciding with the burst gating signal.

3. A chrominance-channel circuit as claimed in claim 1, wherein the output signal from the parallel subtracter is applied to the first input of a second parallel adder having its output connected via a third limiter to the input of a fifth buffer memory whose output is coupled to the second input of the second parallel adder, and which has normalizing-data inputs and the enable input of the accumulator.

4. A chrominance-channel circuit as claimed in claim 2, wherein the output signal from the parallel subtracter is applied to the first input of a second parallel adder having its output connected via a third limiter to the input of a fifth buffer memory whose output is coupled to the second input of the second parallel adder, and which has normalizing-data inputs and the enable input of the accumulator.

5. A chrominance-channel circuit as claimed in claim 1, additionally comprising:

a first bus switch having its path from the break-contact input to the output inserted between the output of the chroma filter and the associated input of the parallel multiplier and its make-contact input connected to the input of the chroma filter;

a second bus switch having its path from the break-contact input to the output inserted between the output of the first limiter and the input of the chroma demodulator and its make-contact input connected to the input of the chroma filter;

a first test enable signal and a second test enable signal, which does not overlap the first test enable signal, being applied to the control input of the first bus switch and to the control input of the second bus switch, respectively;

an actuating signal being applied to the input of the color killer stage during the second test enable signal;

a normalizing signal being applied to the enable input of the fifth buffer memory during a third test enable signal; and in addition to the usual contact pads, there is a contact pad via which the test-result signals of the individual subcircuits are accessible.

6. A chrominance-channel circuit as claimed in claim 2, additionally comprising:

a first bus switch having its path from the break-contact input to the output inserted between the output of the chroma filter and the associated input of the parallel multiplier and its make-contact input connected to the input of the chroma filter;

a second bus switch having its path from the break-contact input to the output inserted between the output of the first limiter and the input of the chroma demodulator and its make-contact input connected to the input of the chroma filter;

a first test enable signal and a second test enable signal, which does not overlap the first test enable signal, being applied to the control input of the first bus switch and to the control input of the second bus switch, respectively;

an actuating signal being applied to the input of the color killer stage during the second test enable signal;

a normalizing signal being applied to the enable input of the fifth buffer memory during a third test enable signal; and in addition to the usual contact pads, there is a contact pad via which the test-result signals of the individual subcircuits are accessible.

7. A chrominance-channel circuit as claimed in claim 3, additionally comprising:

a first bus switch having its path from the break-contact input to the output inserted between the output of the chroma filter and the associated input of the parallel multiplier and its make-contact input connected to the input of the chroma filter;

a second bus switch having its path from the break-contact input to the output inserted between the output of the first limiter and the input of the chroma demodulator and its make-contact input connected to the input of the chroma filter;

a first test enable signal and a second test enable signal, which does not overlap the first test enable signal, being applied to the control input of the first bus switch and to the control input of the second bus switch, respectively;

an actuating signal being applied to the input of the color killer stage during the second test enable signal;

a normalizing signal being applied to the enable input of the fifth buffer memory during a third test enable signal; and in addition to the usual contact pads, there is a contact pad via which the test-result signals of the individual subcircuits are accessible.

8. A chrominance-channel circuit as claimed in claim 4, additionally comprising:

a first bus switch having its path from the break-contact input to the output inserted between the output of the chroma filter and the associated input of the parallel multiplier and its make-contact input connected to the input of the chroma filter;

a second bus switch having its path from the break-contact input to the output inserted between the output of the first limiter and the input of the chroma demodulator and its make-contact input connected to the input of the chroma filter;

a first test enable signal and a second test enable signal, which does not overlap the first test enable signal, being applied to the control input of the first bus switch, respectively;

an actuating signal being applied to the input of the color killer stage during the second test enable signal;

a normalizing signal being applied to the enable input of the fifth buffer memory during a third test enable signal; and in addition to the usual contact pads, there is a contact pad via which the test-result signals of the individual subcircuits are accessible.

9. A method of testing a chrominance-channel circuit as claimed in claim 5, characterized by the following features:

in a first step, the chroma demodulator is tested by applying the second test enable signal to the control input of the second bus switch, the actuating signal to the input of the color killer stage, and a known data sequence to the input of the chroma filter;

in a second step, the parallel multiplier is tested by applying the first test enable signal to the control input of the first bus switch, the third test enable signal and the normalizing signal to the enable input of the accumulator, the normalizing data to the normalizing-data input of the accumulator, and a known data sequence to the input of the chroma filter;

in further steps, the absolute-value formers the first adder, and the parallel comparator are tested by applying the first test enable signal to the control input of the first bus switch, and known data sequences to the input of the chroma filter, and in the last step, the accumulator is tested by applying the first test enable signal to the control input of the first bus switch, the third test enable signal and the normalizing signal to the enable input of the accumulator, the normalizing data to the normalizing data to the normalizing-data input of the accumulator, a trigger signal to the second limiter, and known data sequences to the minuend input of the parallel subtracter.

10. A method of testing a chrominance-channel circuit as claimed in claim 6, characterized by the following features:

in a first step, the chroma demodulator is tested by applying the second test enable signal to the control input of the second bus switch, the actuating signal to the input of the color killer stage, and a known data sequence to the input of the chroma filter;

in a second step, the parallel multiplier is tested by applying the first test enable signal to the control input of the first bus switch, the third test enable signal and the normalizing signal to the enable input of the accumulator, the normalizing data to the normalizing-data input of the accumulator, and a known data sequence to the input of the chroma filter;

in further steps, the absolute-value formers the first adder, and the parallel comparator are tested by applying the first test enable signal to the control input of the first bus switch, and known data sequences to the input of the chroma filter, and in the last step, the accumulator is tested by applying the first test enable signal to the control input of the first bus switch, the third test enable signal and the normalizing signal to the enable input of the accumulator, the normalizing data to the normalizing-data input of the accumulator, a trigger signal to the second limiter, and known data sequences to the minuend input of the parallel subtracter.

11. A method of testing a chrominance-channel circuit as claimed in claim 7, characterized by the following features:

in a first step, the chroma demodulator is tested by applying the second test enable signal to the control input of the second bus switch, the actuating signal to the input of the color killer stage, and a known data sequence to the input of the chroma filter;

in a second step, the parallel multiplier is tested by applying the first test enable signal to the control input of the first bus switch, the third test enable signal and the normalizing signal to the enable input of the accumulator, the normalizing data to the normalizing-data input of the accumulator, and a known data sequence to the input of the chroma filter;

in further steps, the absolute-value formers the first adder, and the parallel comparator are tested by applying the first test enable signal to the control input of the first bus switch, and known data sequences to the input of the chroma filter, and in the last step, the accumulator is tested by applying the first test enable signal to the control input of the first bus switch, the third test enable signal and the normalizing signal to the enable input of the accumulator, the normalizing data to the normalizing-data input of the accumulator, a trigger signal to the second limiter, and known data sequences to the minuend input of the parallel subtracter.

12. A method of testing a chrominance-channel circuit as claimed in claim 8, characterized by the following features:

in a first step, the chroma demodulator is tested by applying the second test enable signal to the control input of the second bus switch, the actuating signal to the input of the color killer stage, and a known data sequence to the input of the chroma filter;

in a second step, the parallel multiplier is tested by applying the first test enable signal to the control input of the first bus switch, the third test enable signal and the normalizing signal to the enable input of the accumulator, the normalizing data to the normalizing-data input of the accumulator, and a known data sequence to the input of the chroma filter;

in further steps, the absolute-value formers the first adder, and the parallel comparator are tested by applying the first test enable signal to the control input of the first bus switch, and known data sequences to the input of the chroma filter, and in the last step, the accumulator is tested by applying the first test enable signal to the control input of the first bus switch, the third test enable signal and the normalizing signal to the enable input of the accumulator, the normalizing data to the normalizing-data input of the accumulator, a trigger signal to the second limiter, and known data sequences to the minuend input of the parallel subtracter.

* * * * *